(12) United States Patent
Cohen

(10) Patent No.: US 6,250,571 B1
(45) Date of Patent: Jun. 26, 2001

(54) DRIP IRRIGATION EMITTERS

(76) Inventor: Amir Cohen, Yuvalim, 20 142, Doar Na Misgav (IL)

(*) Notice: Subject to any disclaimer, the term of this patent is extended or adjusted under 35 U.S.C. 154(b) by 0 days.

(21) Appl. No.: 09/466,906

(22) Filed: Dec. 20, 1999

(30) Foreign Application Priority Data

Dec. 21, 1998 (IL) .......................................................... 127648
Sep. 2, 1999 (IL) .......................................................... 131716

(51) Int. Cl.[7] .................................................... B05B 15/00

(52) U.S. Cl. ........................ 239/542; 239/547; 239/533.1

(58) Field of Search ................................. 239/542, 533.1, 239/547, 548, 566, 567; 138/42, 43, 46

(56) References Cited

U.S. PATENT DOCUMENTS

| 5,279,462 | 1/1994 | Mehoudar . |
| 5,400,973 | 3/1995 | Cohen . |
| 5,615,838 | 4/1997 | Eckstein et al. . |

*Primary Examiner*—Lisa Ann Douglas
(74) *Attorney, Agent, or Firm*—Benjamin J. Barish

(57) ABSTRACT

A drip irrigation emitter includes a body member having an inlet for receiving pressurized water, an outlet, and a connecting passageway having a plurality of baffles spaced from each other in the direction of the water flow from the inlet to the outlet to define a labyrinth flow path cooperable with a deformable membrane which regulates the flow through the labyrinth flow path in response to the inlet pressure. The baffles are formed with notches in the sides thereof facing the membrane such that the membrane is deformed by an increase in the inlet pressure first into engagement with the sides of the baffles facing the membrane, and then into the notches, to regulate the flow to the outlet.

48 Claims, 13 Drawing Sheets

DRIP IRRIGATION EMITTERS

FIELD AND BACKGROUND OF THE INVENTION

The present invention relates to drip irrigation emitters particularly, but not exclusively, of the regulating labyrinth type described in my prior U.S. Pat. Nos. 5,400,973 and 5,609,303, as well as in Eckstein et al U.S. Pat. No. 5,615,838 and Mehoudar U.S. Pat. No. 5,279,462.

Drip irrigation emitters of the foregoing type generally include a body member having an inlet for receiving pressurized water, an outlet, and between the inlet and the outlet, a connecting passageway including a plurality of baffles spaced in the direction of the water flow from the inlet to the outlet, and extending transversely to that direction, with the baffles being alternatingly joined at one end to the body member and spaced at the opposite end from the body member to define a labyrinth flow path. A deformable membrane overlies the baffles with one face of the membrane engageable with one side of the baffles, and the opposite face of the membrane being exposed to the pressure of the water at the inlet, such that the membrane is deformable by the inlet pressure towards and away from the baffles to control the labyrinth flow path in response to the inlet pressure.

OBJECTS AND BRIEF SUMMARY OF THE INVENTION

An object of the present invention is to provide drip irrigation emitters particularly, but not exclusively of the foregoing type having a number of advantages, as will be described more particularly below.

According to one aspect of the present invention, there is provided a drip irrigation emitter of the regulating labyrinth type described above, characterized in that the baffles are formed with notches in the sides thereof facing the membrane such that the membrane is deformed by an increase in the inlet pressure first into engagement with the sides of the baffles facing the membrane, and then into the notches to regulate the flow to the outlet.

As will be described more particularly below, drip irrigation emitters constructed in accordance with the foregoing features effect the regulation in two stages according to the inlet pressure; in the first stage, the membrane seats on the baffle sides facing the membrane; and in the second stage, the membrane enters the notches to reduce the effective cross-sectional area thereof, and thereby to restrict the water flow therethrough, in accordance with the inlet pressure.

According to further features in this aspect of the invention, the sides of the baffles facing the membrane are of concave configuration; also, the notches are preferably of increasing depth from one end of the labyrinth flow path to the opposite end. Such a construction permits a continuous and gradual decrease to be produced in cross-sectional areas of the bypasses defined by the notches in response to an increase in the inlet pressure.

According to one described preferred embodiment, the emitter is of the "integral tube" type, wherein the body member is in the form of an elongated, relatively flat strip to be bonded to the inner face of a water supply tube having a discharge opening through its wall communicating with the outlet of the body member.

According to further features in one described preferred embodiment, the emitter further includes a cover which is constituted of two half-sections each joined by an integral hinge to a lateral side of the body member, permitting the cover sections to be folded over and to be secured to the body member with the membrane inbetween the cover sections and the body member.

Another embodiment is described wherein the drip irrigation emitter is of the "button" type, in which the body member, labyrinth flow path, and membrane are all of a circular configuration.

According to further features in a further described preferred embodiment, one face of the cover faces the interior of the water supply tube, and the opposite face of the cover faces and overlies the opposite face of the membrane; the cover being formed with a plurality of pins projecting from the opposite face thereof receivable within holes formed in the body member.

In one described embodiment, the one face of the cover (that facing the interior of the water supply tube) is contactable by a feeder slide when fed thereby to the inner surface of the water supply tube, and configured to produce a contact surface with the feeder slide which is perpendicular to the transverse axis of the water supply tube to thereby facilitate the fixing of the cover and the body member to the inner face of the water supply tube as the body member is fed thereto by the feeder slide.

According to still further features in that described preferred embodiment, the one face of the cover is formed with a longitudinally-extending rib eccentric to the longitudinal axis of the cover, which rib facilitates the proper orientation of the cover and body member during the fixing of the cover and body member to the interior of the water supply tube. In addition, the opposite ends of the body member are formed with eccentric ribs to be aligned with the eccentric rib of the cover, and thereby to facilitate orienting the cover with respect to the body member when secured thereto.

According to still further features in one described preferred embodiment, the opposite face of the cover forms with the membrane a valve which automatically opens the inlet in response to a pressure of between 0 and 2 meters of water within the water supply tube, and which substantially blocks flow in the reverse direction in response to a negative pressure within the water supply tube. Preferably, the opening pressure is 0 meters of water. Such a construction better assures more complete drainage of the water supply tube when the water supply is cut-off, thereby minimizing the accumulation of water within the water supply tube favorable for the growth of organisms that could clogg the irrigation system.

Further features and advantages of the invention will be apparent from the description below.

BRIEF DESCRIPTION OF THE DRAWINGS

The invention is herein described, by way of example only, with reference to the accompanying drawings, wherein:

FIGS. 10a and 10b are sectional views along lines 10a—10a and 10a—10a, respectively, of FIG. 10 but including the regulating membrane;

DESCRIPTION OF PREFERRED EMBODIMENTS

The Embodiment of FIGS. 1–10

Figure 1:
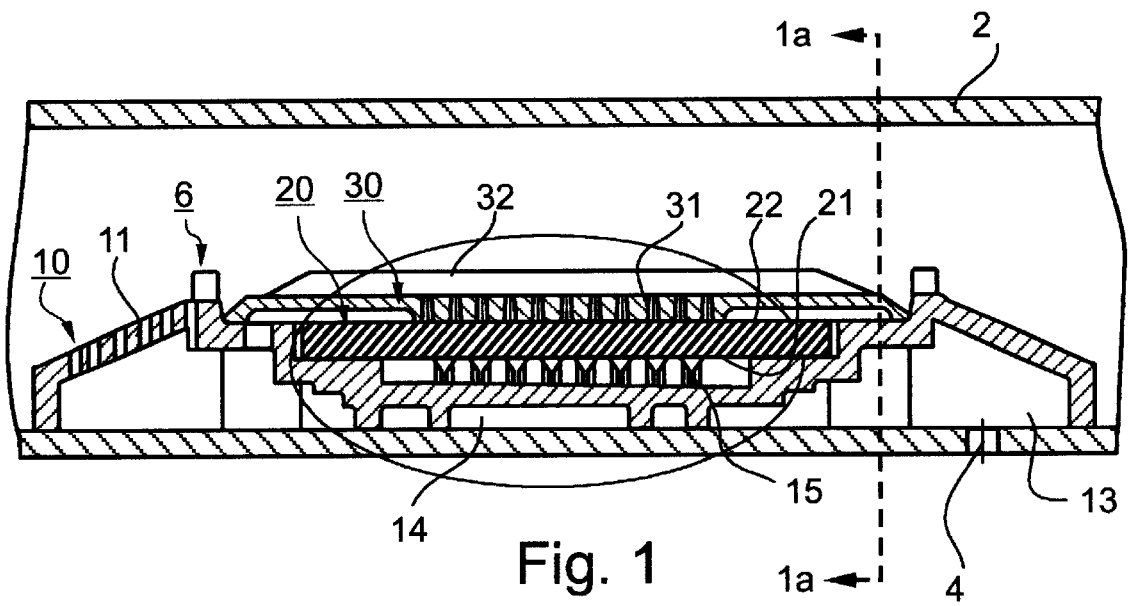
FIG. 1 is a longitudinal sectional view illustrating a part of an integral tube type of drip irrigation emitter constructed in accordance with the present invention.

FIG. 1 illustrates a drip irrigation emitter of the integral tube type, but modified to incorporate the present invention. Such an emitter includes a water supply tube 2 formed with a plurality of water discharge openings 4 spaced along its length, with a drip irrigation emitter, generally designated 6, bonded to the inner face of the tube in alignment with each of the discharge openings 4. For purposes of simplifying the drawings, only one such drip irrigation emitter 6 is illustrated in FIG. 1, it being appreciated that the water supply tube 2 would include a plurality of such emitters spaced along the length of the tube with each in alignment with a discharge opening 4.

Each such drip irrigation emitter 6 includes a body member 10 bonded to the inner face of the water supply tube 2; a membrane 20, which cooperates with body member 10 to produce a regulated labyrinth flow path as will be described below; and a cover 30 securing the membrane 20 to the body member 10.

The body member 10 is formed with a plurality of slits 11, serving as filtering inlets, for inletting the water from the interior of the tube 2 into the emitter 6, and with an outlet opening 12 (FIG. 2) which communicates with a cavity 13 aligned with one of the discharge openings 4 for outletting the water from the emitter. Body member 10 is further formed with a connecting passageway connecting the inlet slits 11 to the outlet 12. This passageway includes a non-regulating labyrinth 14 (FIG. 2) on the outer face of the body member 10 in cooperation with the inner face of the water supply tube 2; and a regulating labyrinth 15 (FIG. 3) on the inner face of the body member in cooperation with membrane 20.

The non-regulating labyrinth 14 is immediately downstream of the inlet slits 11. It is of a conventional construction, including a plurality of baffles 14a alternatingly joined to the body member at opposite sides and terminating in the region of the labyrinth center line so as to define, with the inner surface of the water supply tube 2, a non-regulating labyrinth. Such a labyrinth functions to reduce the pressure of the inleted water before reaching the regulating labyrinth 15.

The regulating labyrinth 15 extends from an inlet 15a, communicating with the outlet from labyrinth 14, to the outlet 12. This labyrinth also includes a plurality of baffles 16 alternatingly joined to opposites sides of the body member and terminating in the region of the labyrinth center line to define a labyrinth flow path with face 21 of the membrane 20. In this case, however, the flow path is a regulating one and changes in response to the inlet pressure to the emitter, i.e., the pressure within the water supply tube. Thus such inlet pressure is applied to the opposite face 22 of membrane 20, and therefore deforms membrane 20 with respect to baffles 16 to control the flow through the labyrinth 15.

The structure of baffles 16 in the regulating labyrinth 15 is more particularly illustrated in FIGS. 4, 5, 6a–6c, and 7a–7c.

Figure 5:
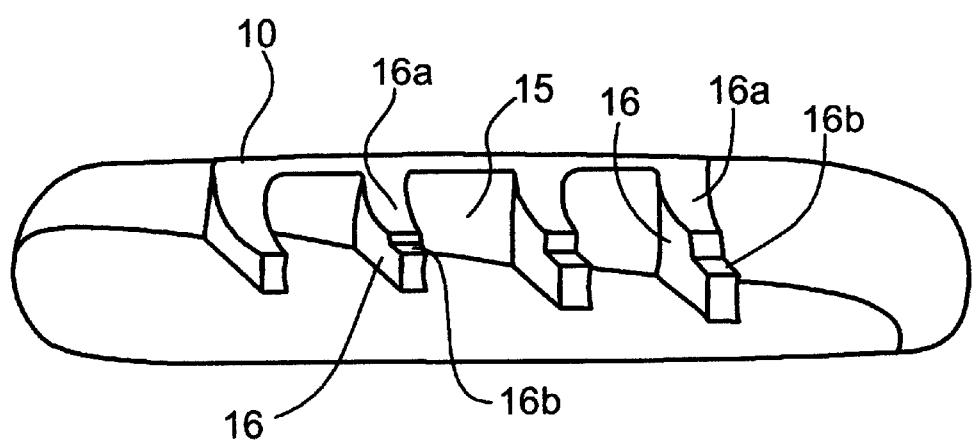
FIG. 5 is an enlarged three-dimensional view more particularly illustrating the construction of the baffles in the emitter of FIGS. 1–3.
Figure 6A:
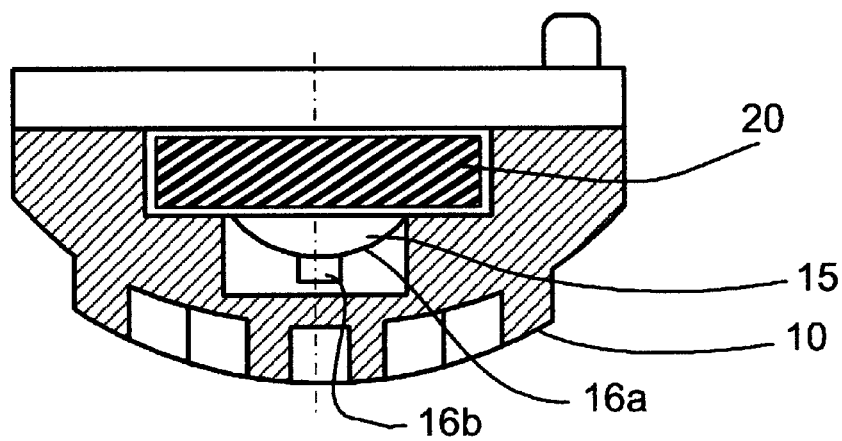
FIGS. 6a, 6b, and 6c, are sectional views along lines 6a—6a, 6b—6b and 6c—6c, respectively, in FIG. 4.
Figure 6B:
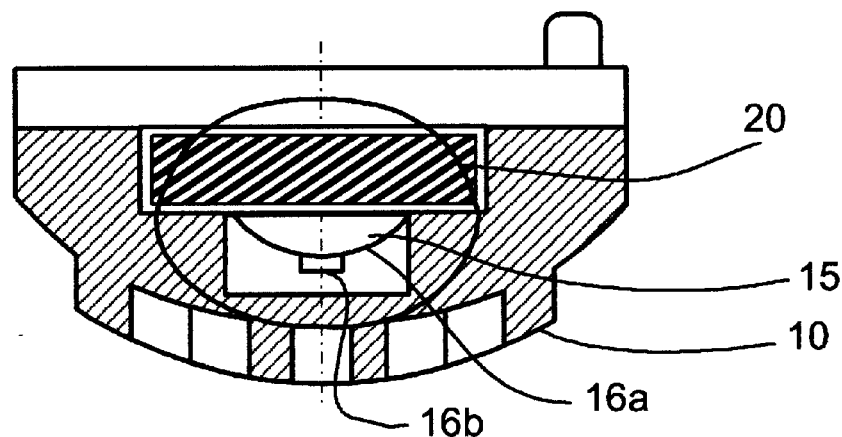
Figure 6C:
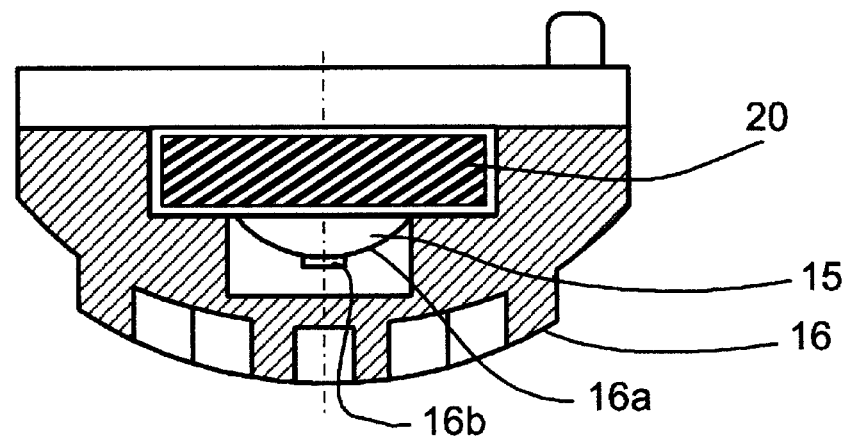

As shown particularly in FIG. 5, each baffles 16 extends from one side of the body member 10 and terminates in the region of the longitudinal center line of the labyrinth flow path 15 defined by these baffles. It will be appreciated that the baffles 16 joined to the opposite wall (not illustrated in FIG. 5) of the labyrinth flow path will be located between the baffles 16 seen in FIG. 5, and will also terminate in the region of the longitudinal center of the labyrinth flow path. The upper face 16a of each baffle is of a concave configuration and is formed with a notch 16b at the end of the baffle.

Figure 7A:
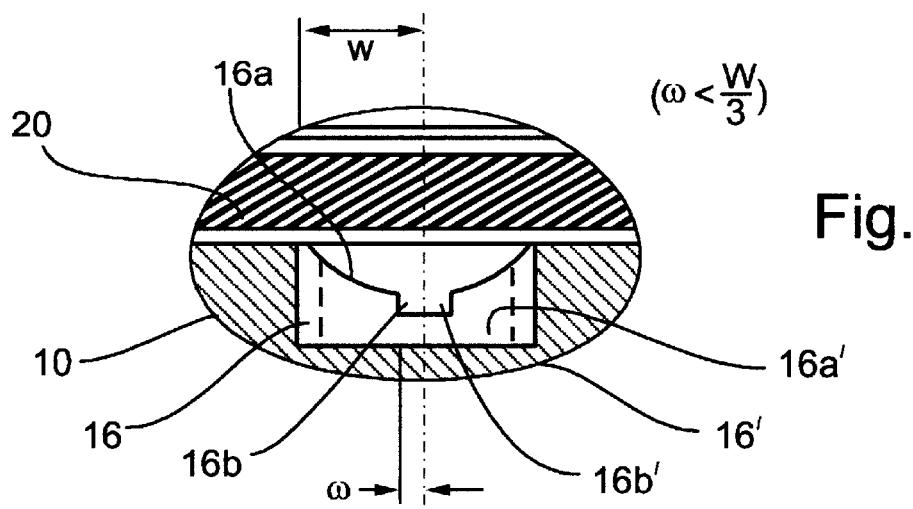
FIG. 7a is an enlarged view of one of the baffles of FIGS. 6a14 6c.

It will thus be seen that in the illustrated construction (e.g., FIGS. 3 and 5), the baffles 16 from the opposite side walls of body member 10 extend for substantially one-half the width of the labyrinth flow path, and their notches 16b are at the free ends of the baffles, i.e., in the center region of the labyrinth flow path. It will also be seen that the notches 16b are of increasing depth from one end of the labyrinth flow path to the opposite end. This is also shown in FIG. 7a, wherein the staggered lines of baffles are shown at 16 and 16', respectively. As also shown in FIG. 7a, the width (w) of each notch 16b, 16b', is less than one-third the width (W) of the respective baffle 16, 16'.

Figure 7B:
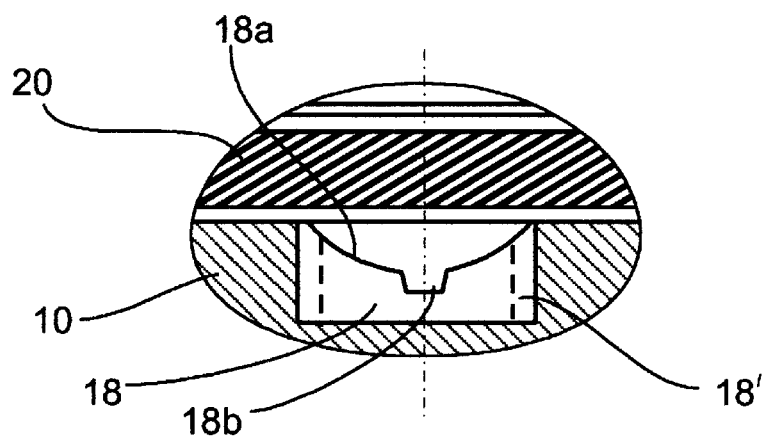
FIGS. 7b and 7c illustrate possible modifications in the construction of the baffles and notches.
Figure 7C:
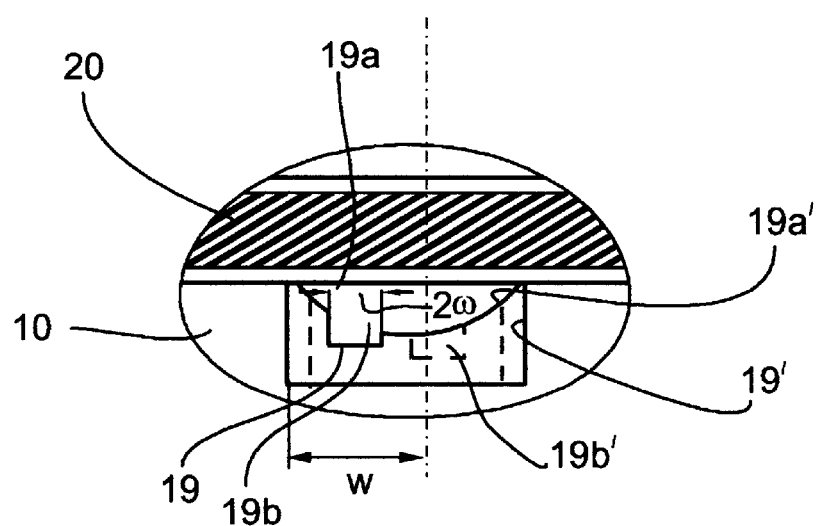

FIGS. 7b and 7c illustrate possible variations in the construction of the baffles. Thus, FIG. 7b illustrates a variation wherein the baffles, therein designated 18, 18', also extend for substantially one-half the width of the labyrinth flow path but the notches 18b are of a trapezoidal shape, in which the two sides are at an obtuse angle to the bottom of the notch. FIG. 7c illustrates a construction similar to that of FIG. 7a, except that the notches, therein shown at 19a, 19a' in baffles 19, 19', respectively, are located off-center from the center line of the labyrinth flow path 15. In this case, each notch (19b) is twice the width (2w) of the notches (e.g., 16b) in FIG. 7a, as shown in FIG. 7c. While the notches (19a, 19a') are shown in FIG. 7c as applied to all the baffles in the labyrinth, it will be appreciated that they could be applied only to one set of the baffles (e.19 or 19'), i.e., to alternate baffles along the length of the labyrinth, as described below with respect to FIG. 14.

Figure 1A:
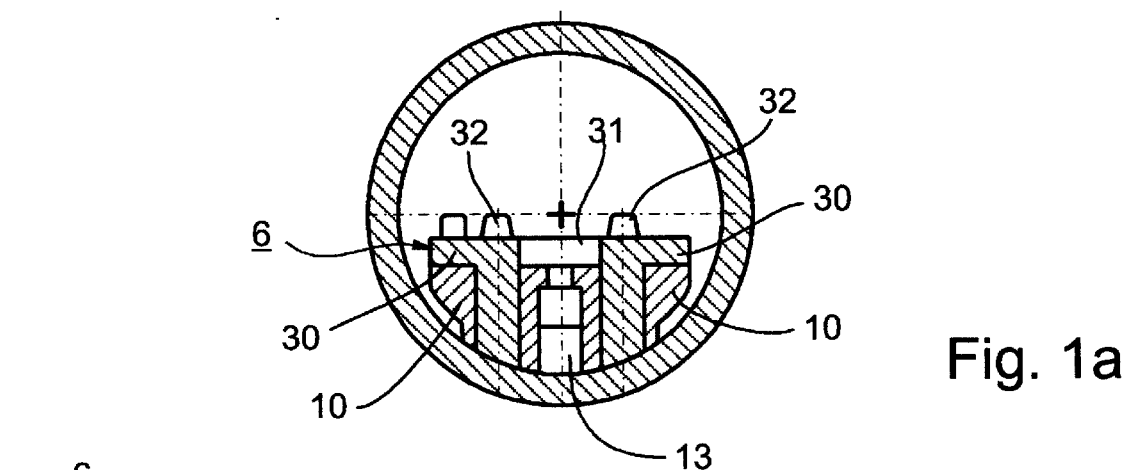
FIG. 1a is a sectional view along line 1a—1a of FIG. 1.
Figure 2:
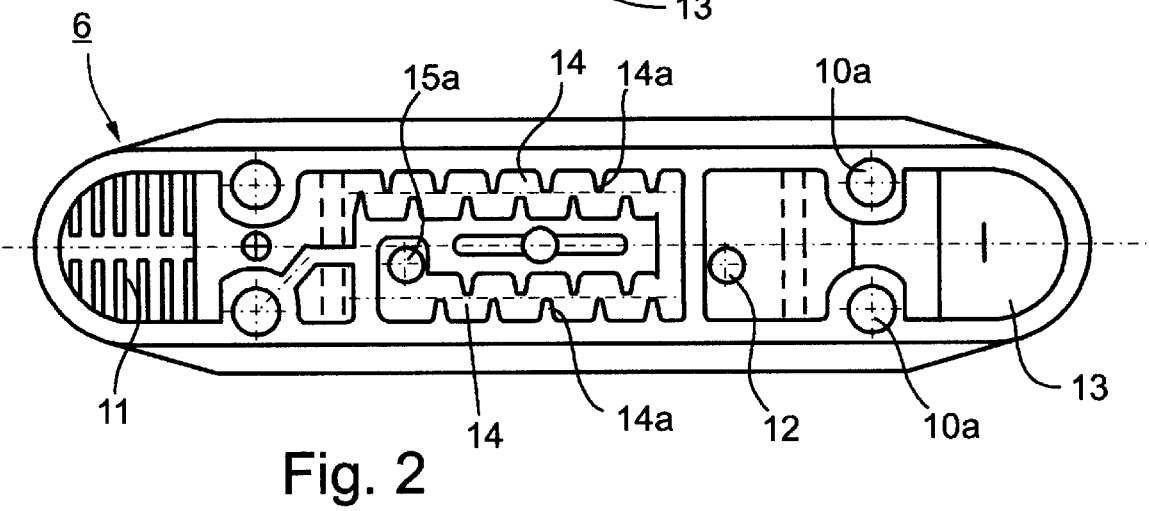
FIG. 2 is a plan view illustrating the outer face of the drip irrigation emitter of FIG. 1.
Figure 3:
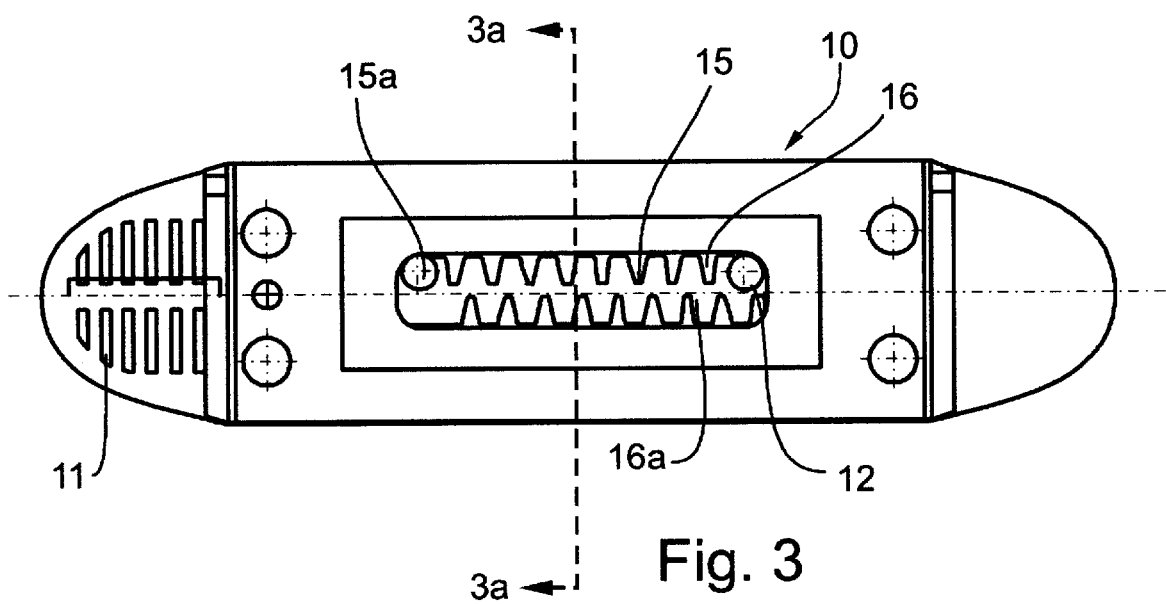
FIG. 3 is a plan view illustrating the inner face of the emitter of FIG. 1.
Figure 3A:
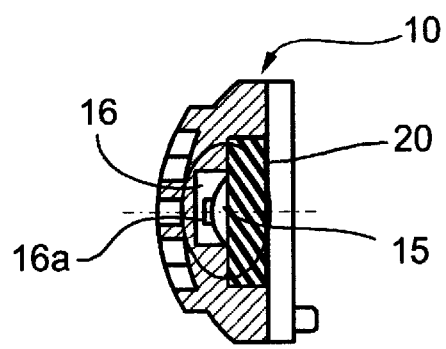
FIG. 3a is a sectional view along line 3a—3a of FIG. 3.
Figure 4:
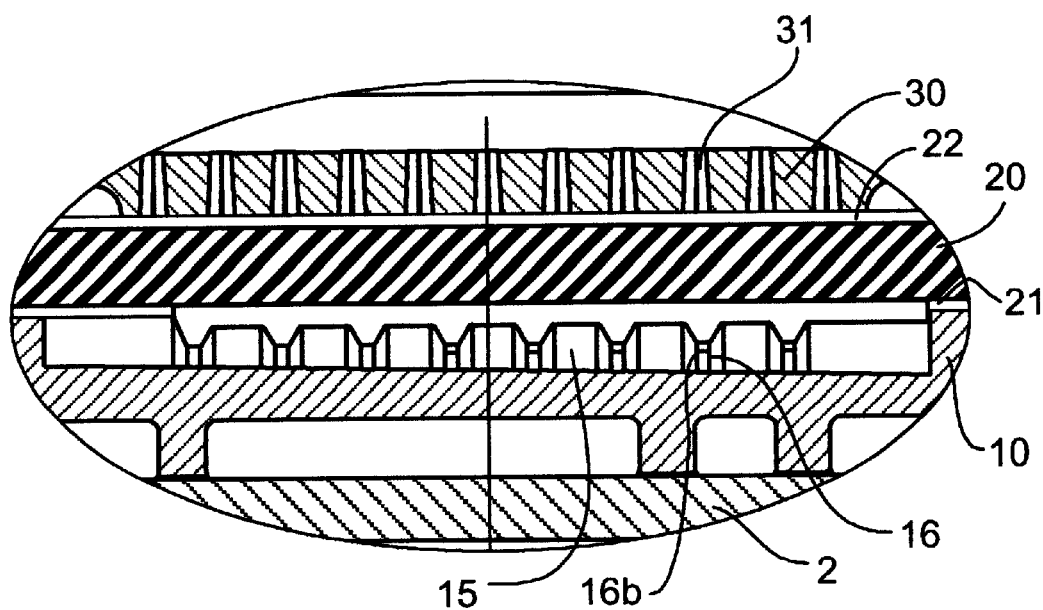
FIG. 4 is an enlarged fragmentary view more particularly illustrating the regulating labyrinth flow path in the emitter of FIGS. 1–3.

As shown particularly in FIGS. 1 and 1a, the cover 30 is formed with a similar series of slits 31 serving as connecting passageways to the interior of the supply tube 2. This cover is further formed with a pair of longitudinally extending ribs 32 on opposite sides of the slits 31 for reinforcement purposes. The cover further includes a plurality of pins (not shown) received within sockets 10a (FIG. 2) formed in the body member.

In all of the foregoing constructions of the baffles (16, 18, 19), the labyrinth flow path 15 regulates the water flow therethrough in two stages in response to the inlet pressure. Thus, in the first stage, membrane 20 seats firmly against the concave upper sides (e.g., 16a) of all the baffles to restrict the labyrinth flow path but to leave the notches (e.g., 16b) unrestricted; and in a second stage when the inlet pressure further increase, the membrane 20 is pressed into the notches of the baffles, to restrict the effective cross-sectional areas of these baffles, and thereby to further restrict the flow through the labyrinth flow path.

Preferably, as shown in FIGS. 5 and 6a–6c, the notches are of increasing depth from one end of the labyrinth flow path to the opposite end (in this case from the inlet 15a towards the outlet 12 to this labyrinth). In such case, the increase in the inlet pressure will sequentially reduce the cross-sectional areas of the notches in a gradual and continuous manner to thereby continuously and finely regulate the flow through this labyrinth flow path in response to the inlet pressure.

Figure 8:
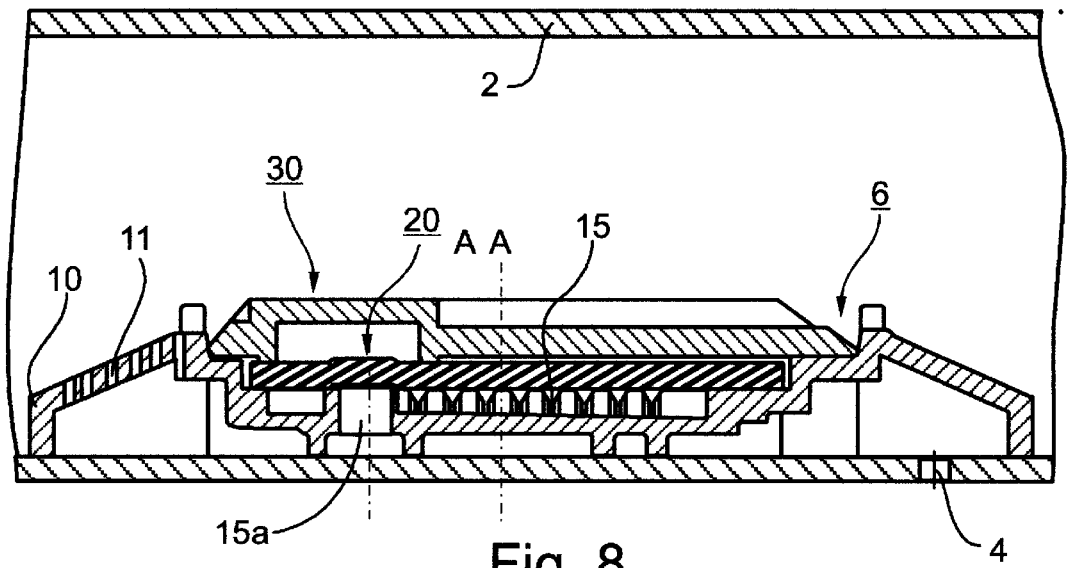
FIG. 8 is a sectional view corresponding to that of FIG. 1, but illustrating a modification in the construction of the emitter to include a one-way valve.
Figure 9:
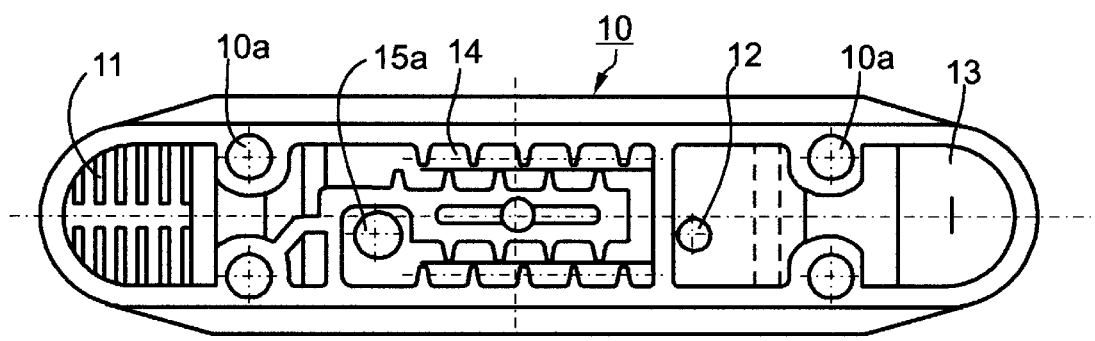
FIG. 9 is a plan view of the outer face only of the body member in the emitter of FIG. 8.

FIGS. 8 and 9 illustrate a modification in the construction of the emitter, wherein opening 15a, which serves as the outlet from the non-regulating labyrinth 14 and the inlet to the regulating labyrinth 15, is covered by a portion of membrane 20 so that it functions as a one-way valve permitting the flow of water in the forward direction through opening 15a, but not in the reverse direction. This one-way valve thus prevents water flow into the regulating labyrinth 15 towards the emitter outlet 12 until there is a predetermined minimum inlet pressure to open the valve. Such a valve prevents draining of the water from the emitter back into the interior of the water supply tube 2 when the pressure is terminated, and thereby permits the emitter to be operated in a pulsed mode. In addition, it prevents the entry of foreign particles into this labyrinth by the vacuum produced when the water supply tube 2 is emptied.

The illustrated arrangement, wherein the one-way valve is at the inlet 15a to the regulating labyrinth, which is at the outlet end of the non-regulating pressure-reducing labyrinth 14, is to be distinguished from the one-way valve constructions in the above-cited Mehoudar U.S. Pat. No. 5,279,462, and Eckstein et al U.S. Pat. No. 5,615,838, wherein the one-way valve is at the inlet end of the non-regulating pressure-reducing labyrinth. Thus, in the arrangement described herein as illustrated in FIGS. 8 and 9, when draining the water supply tube 2, the pressure-reducing labyrinth 14 will also be drained, while the one-way valve will prevent the entry of dirt particles into the regulating labyrinth 15, thereby better assuring that labyrinth 14 will not accummulate dirt particles.

Figure 10:
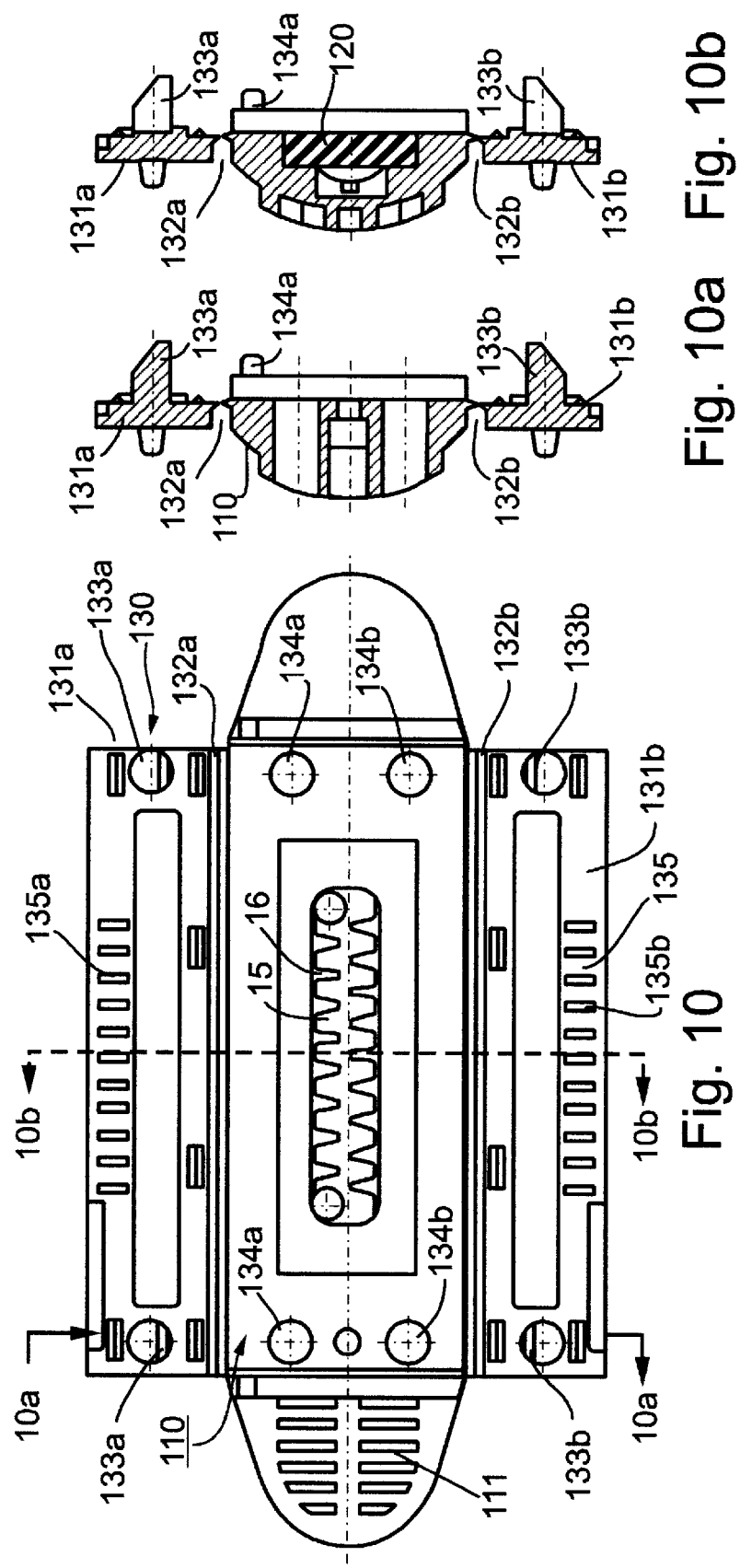
FIG. 10 is a plan view of the inner face of the emitter body member in another construction including an integrally-formed cover.

FIGS. 10, 10a and 10b illustrate a further modification in the construction of the emitter wherein the cover, generally designated 130, is constructed of two half-sections 131a, 131b, each joined, by an integral hinge 132a, 132b, to the opposite lateral sides of the body member 110. Each cover half-section is further integrally formed with a pair of pins 133a, 133b, at its opposite ends adapted to be received with a friction fit in holes 134a, 134b, formed in the body member 110, for firmly securing the two half sections to the body member with the membrane 120 (FIG. 10b) in between. The cover half-sections 131a, 131b are further formed with slits 135a, 135b, which function as filtering inlets into the emitter, similar to slits 31 in FIG. 1.

The Embodiment of FIGS. 11–14

Figure 11:
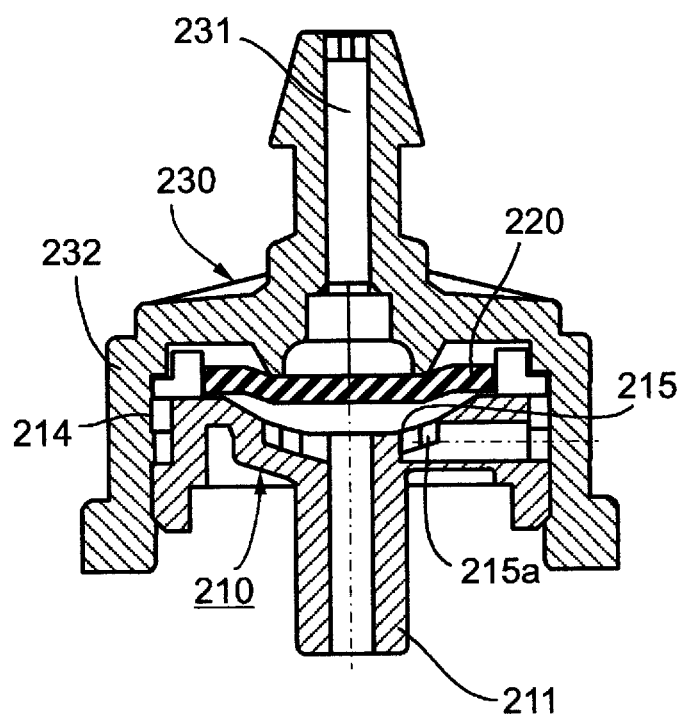
FIG. 11 is a sectional view illustrating a "button" type drip irrigation emitter constructed in accordance with the present invention.
Figure 12:
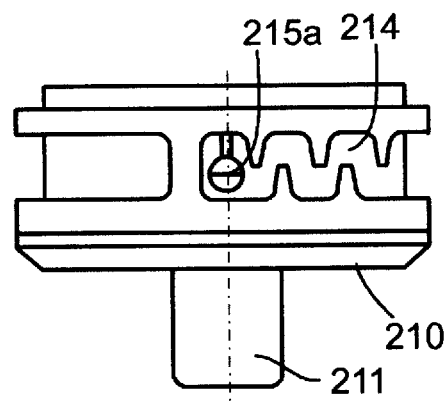
FIG. 12 is a side elevation view illustrating only the body member in the emitter of FIG. 11.
Figure 13:
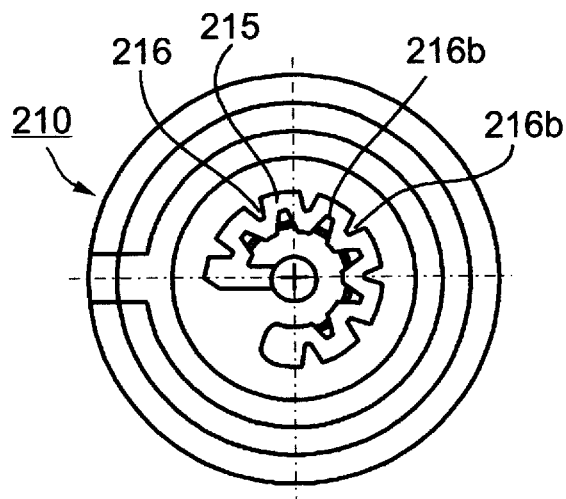
FIG. 13 is a top plan view of the body member in the emitter of FIG. 11.

FIGS. 11–13 illustrate a button-type emitter constructed in accordance with the present invention. This type of emitter also include a body member 210, a membrane 220, and a cover 230 securing the membrane to the body member. Here, however, the members 210, 220, and 230 are all of circular configuration, with the cover 230 in the form of a cap snap-fitted to the body member 210. The cap 230 is formed with the inlet 231, and the body member 210 is formed with the outlet 211.

In such a construction, the baffles defining the pressure-reducing labyrinth 214, in cooperation with the cylindrical wall 232 of the cover 230, are formed in the outer periphery of the body member 210; and the baffles 216 defining the regulating labyrinth 215, in cooperation with membrane 220, are formed centrally of body member 210 coaxial to, and communicating with, its outlet 211. Labyrinth 215 communicates with labyrinth 214 via an opening 215a formed through the peripheral wall of body member 210.

As seen in FIG. 13, the baffles 216 in the regulating labyrinth 215 are of the same construction as described above with respect to FIGS. 1–7c, except that such baffles are formed in a circular array, to define a circular labyrinth flow path, rather than in a linear array as in FIGS. 1–7c. Baffles 216 seen in FIG. 13, also include the notches 216b, which may be formed as described above with respect to FIGS. 1–6c, and therefore such emitters would provide the same advantages as set forth above with respect to the integral-tube type emitter.

Figure 14:
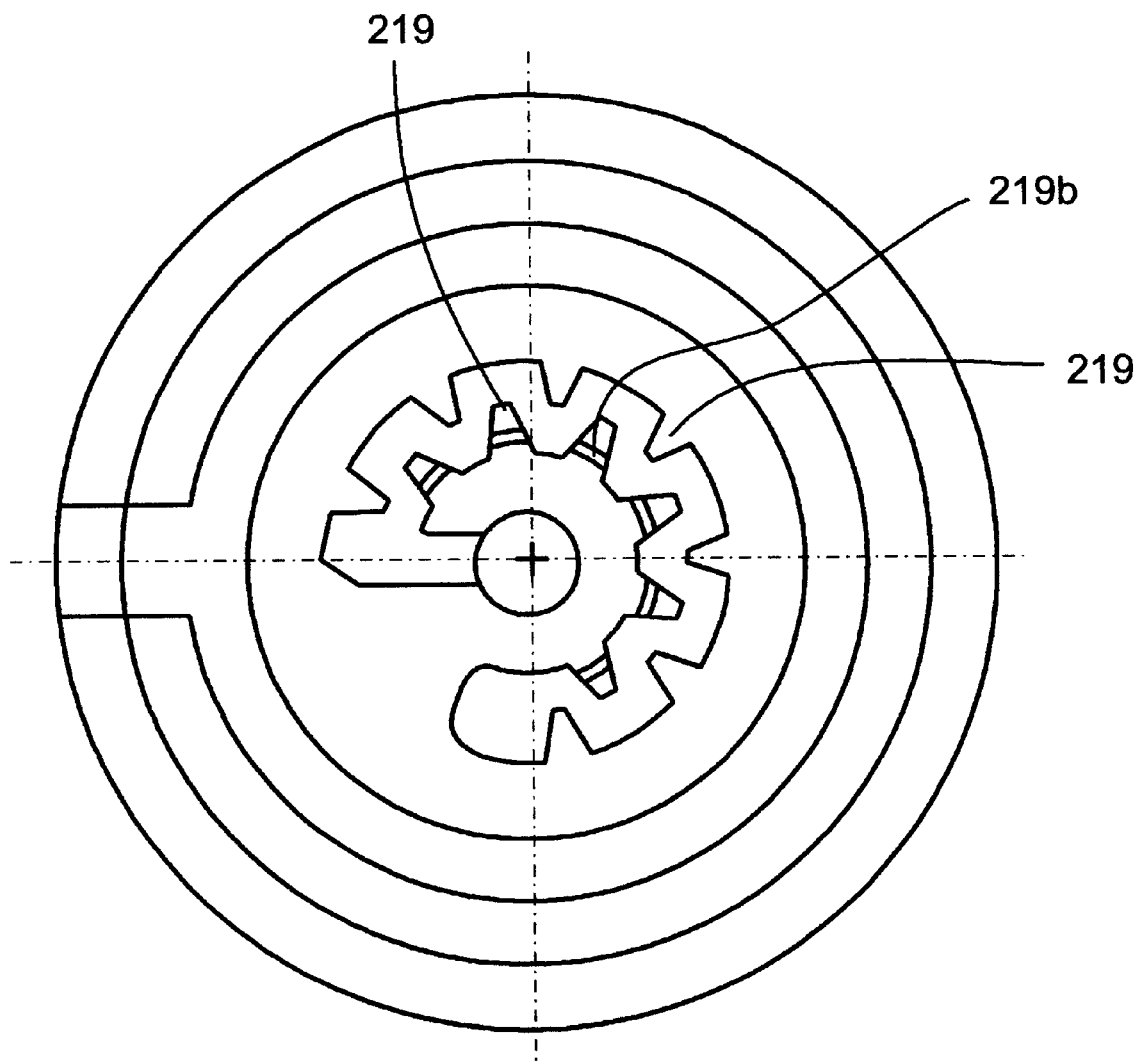
FIG. 14 is a view corresponding to that of FIG. 13 but illustrating a modification in the construction of the emitter.

FIG. 14 illustrates a variation similar to that of FIG. 7c, wherein the notches, designated 219b in FIG. 14, are formed eccentrically of their respective baffles 219. Preferably, they are formed in only one set of baffles, i.e., in alternate baffles along the labyrinth; but they may also be formed in the other set of baffles as described above with respect to FIG. 7c. It will be appreciated that the notches in the emitters of FIGS. 11–14 could also be of other configurations, e.g., that illustrated in FIG. 7b.

The Embodiment of FIGS. 15–21

Figure 19:
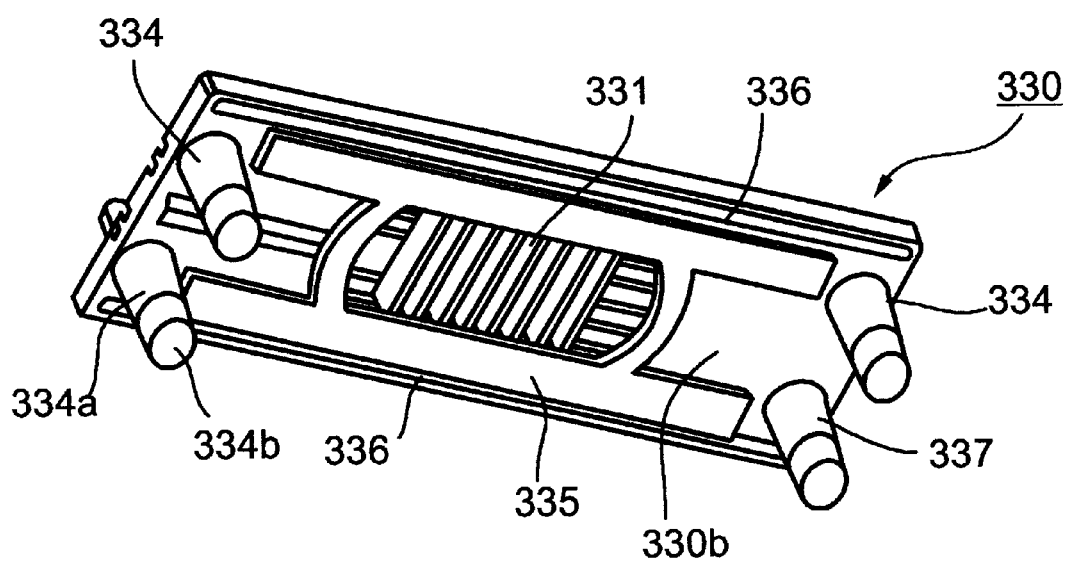
Figure 20:
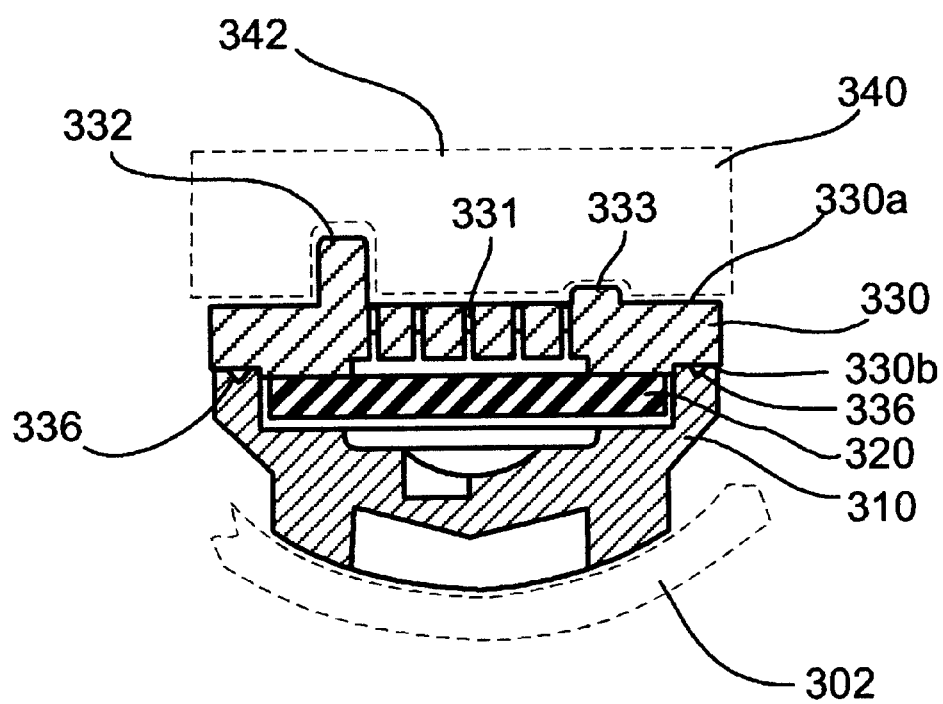
FIG. 20 is a cross-sectional view of the emitter of FIG. 15 along line XX—XX of FIG. 15.
Figure 21:
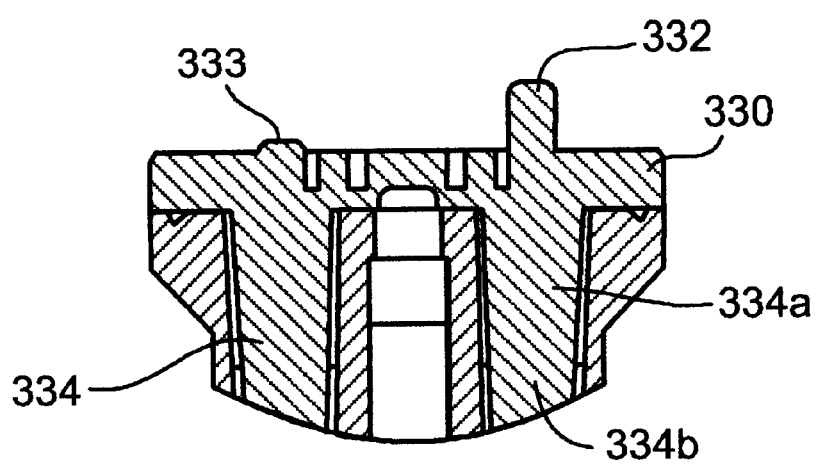
FIG. 21 is a cross-sectional view along line XXI—XX1 of FIG. 15.

FIGS. 15–21 illustrate a drip irrigation emitter also of the integral tube type, similar to the construction of FIGS. 1–10, to be fixed to the inner face of a water supply tube, shown in broken lines at 302 in FIG. 20. Such an emitter also includes a body member 310 in the form of an elongated, generally flat strip bonded to the inner face of the water supply tube 302; a membrane 320, which cooperates with body member 310 to produce a regulated labyrinth flow path; and a cover 330 securing the membrane 320 to the body member 310.

Figure 16:
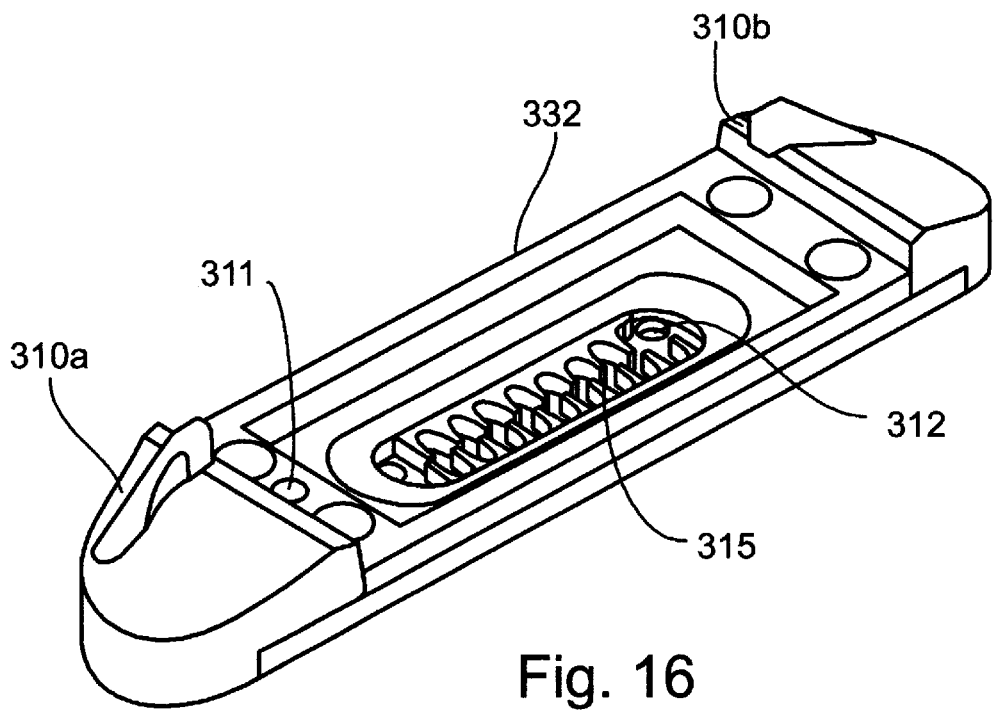
FIGS. 16 and 17 are three-dimensional views illustrating the opposite faces of the body member in the emitter of FIG. 15.
Figure 17:
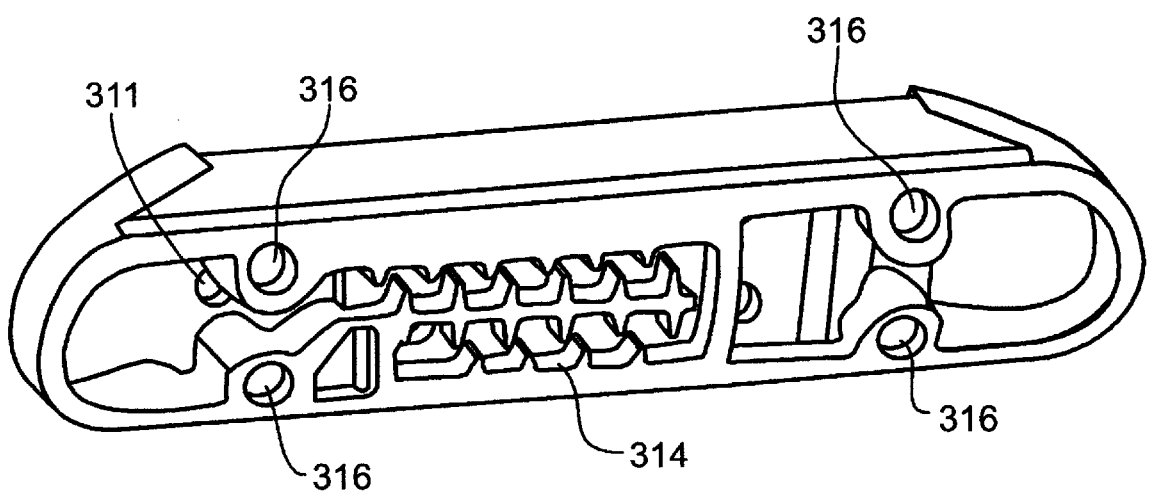
Figure 18:
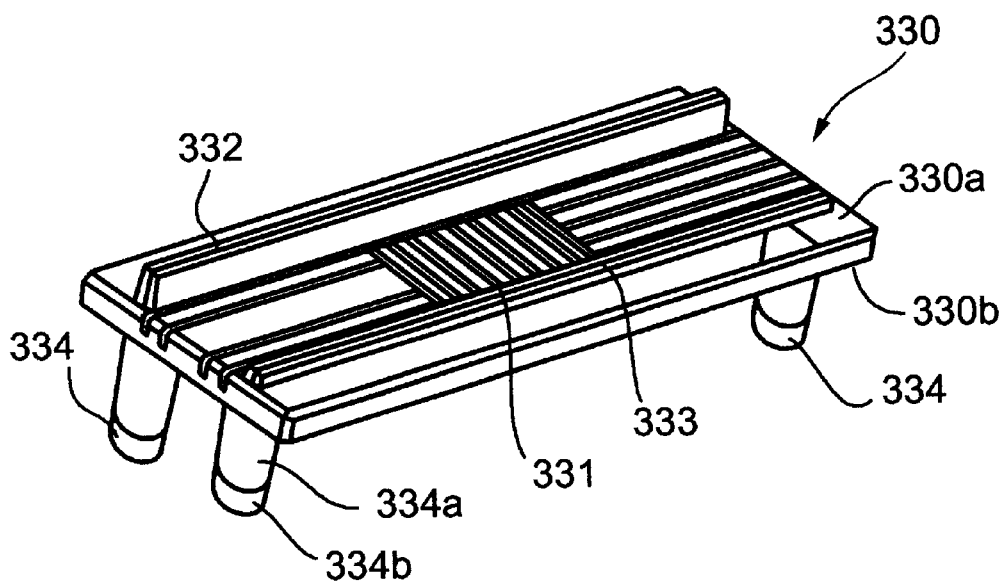
FIGS. 18 and 19 are three-dimensional views illustrating the opposite faces of the cover in the emitter of FIG. 15.

As shown particularly in FIGS. 16 and 17, body member 310 is formed with an inlet 311 connected to an outlet 312 by a non-regulating labyrinth 314 (FIG. 17), on one face of the body member cooperating with the inner face of the water supply tube 302, and a regulating labyrinth 315 (FIG. 16) on the opposite face of the body member cooperating with the membrane 320.

In the emitter of FIGS. 15–21, however, the cover 330 is formed with the inlet openings, which are in the form of a plurality of slits 331 serving to filter the water passing from the interior of the water supply tube 302 into the emitter. Thus, as particularly shown in FIG. 20, one face 330a of cover 330 faces the interior of the water supply tube, whereas the opposite face 330b faces the membrane 320.

Figure 15:
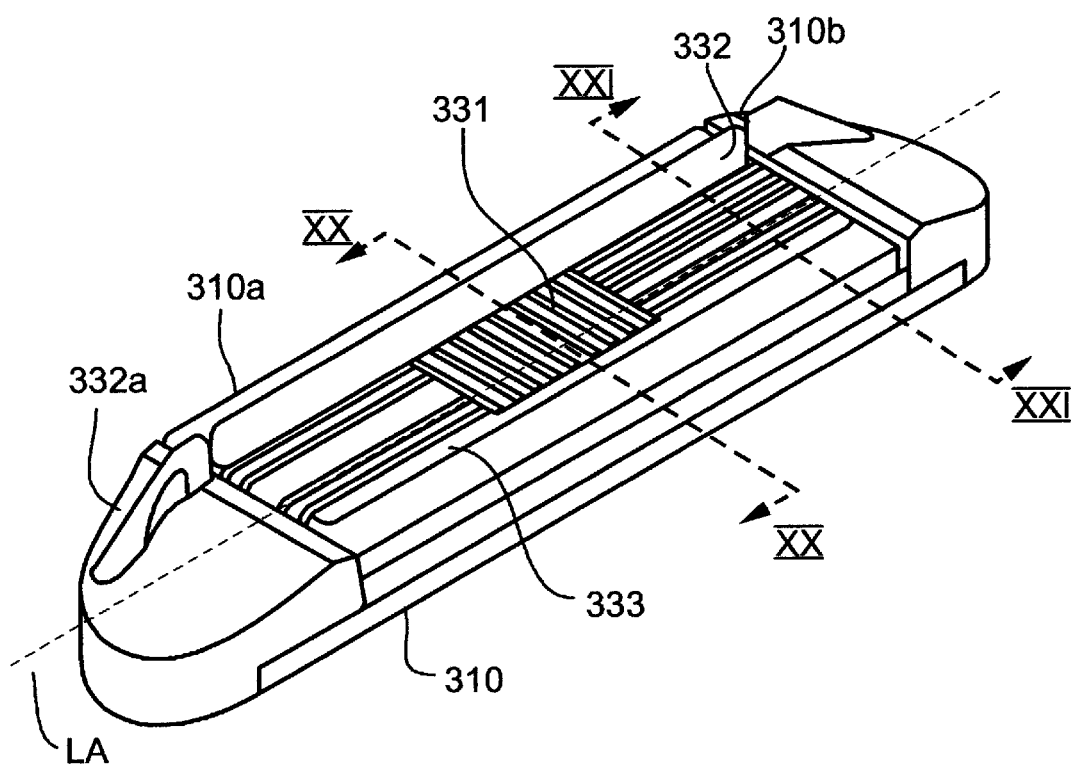
FIG. 15 is a three-dimensional view illustrating a further embodiment of the invention.

As further shown in FIG. 20, (and also in FIG. 15), face 330a of the cover is formed with a longitudinally-extending rib 332 at one side of the cover longitudinal axis LA so as to be eccentric to that axis, and with a shorter rib 333 at the opposite side of the longitudinal axis LA. In addition, the body member 310 is formed with tapered eccentric ribs 310a, 310b, at its opposite ends to be aligned with rib 332 of the cover (FIG. 15). As will be described below, these eccentric ribs facilitate the proper orientation of the cover 330 with respect to the body member 310, and the body member with respect to the water supply tube 302, during the fixing of the cover and body member to the interior of the water supply tube.

As further shown in FIG. 20, face 330a of the cover is substantially flat, and its contact surface with the feeder slide, shown in broken lines at 340 is substantially perpendicular to the transverse axis of the water supply tube 302. This facilitates the fixing of the cover 330 and body member 310 to the inner face of the water supply tube 302 as will be described below.

Cover 330 is of substantially rectangular configuration, and is integrally formed with four pins 334 at its four corners for attaching it to the body member 310. Thus, as shown in FIG. 19, each of the four pins 334 includes a conical section 334a and a cylindircal section 334b at its outer tip. These pins are adapted to be received within complementary-shaped holes 316 formed in the body member 310. As seen particularly in FIG. 21, the holes 316 extend completely through the body member 310; and the pins are longer in length than in their transverse dimension (diameter). Preferably, but not necessarily, the pins 334 are of a sufficient length to project completely through the holes and to be engaged and bonded to the inner surface of the water supply tube 302 when the cover and body member are fixed thereto. Such a construction greatly strengthens the securement of the cover to the body member such as to greatly reduce the possibility that it will separate therefrom even during rough handling of the water supply tube with the body member and cover fixed to the inner face of the tube.

The cover 330 is further formed with a surface, shown at 335 in FIG. 19, projecting from face 330b and uninterruptedly circumscribing, the inlet openings 331. The inlet openings 331 are in an array of oblong configuration, preferably of a generally rectangular configuration; and the circumscribing surface 335 is of corresponding oblong configuration to enclose the array of openings 331. As will be described below, circumscribing surface 335 is engageable with the membrane 320, acting as a one-way valve which normally opens the inlet openings 331 to the interior of the water supply tube 302 in response to a positive pressure of 0–2 meters of water, preferably substantially 0 meters of water, within the water supply tube, but substantially blocks reverse flow through these inlet openings in response to a negative pressure in the water supply tube, thereby preventing drawing dirt into the emitter.

The emitter illustrated in FIGS. 15–21 is applied to the interior of the water supply tube 302 in the following manner.

The membrane is first inserted into the body member 310, and the cover 330 is applied to the body member by force-fitting the pins 334 of the cover into the holes 316 of the body member, or by ultrasonically welding. The emitters so assembled are fed by the feeder slide 340, shown in broken lines at 340 in FIG. 20, into the interior of the water supply tube 302 and guides them to, or presses them against, the inner face of the water supply tube for bonding thereto.

The eccentric rib 332 formed in cover 330, and corresponding ribs 310a, (FIG. 16) 310b in the body member, are received within an eccentric groove 342 in the feeder slide 340, (FIG. 20) which assures the proper orientation of the emitter when fed into the water supply tube. In addition, since face 330a of the cover contacted by the feeder slide 340 is substantially flat and perpendicular to the transverse axis of the water supply tube 302, the guiding or pressing action by the feeder slide 340 will produce a uniform engagement of the body member 310 and the cover 330 with the inner face of the water supply tube 302.

As shown particularly in FIGS. 19 and 20, cover 330 is formed with a rib 336 on each of the opposite sides of its projecting surface 335. Ribs 336 are of triangular shape in cross-section so as to have converging sides (FIG. 20) to concentrate the heat along the contacting surfaces of the body member and cover when the cover is secured by ultra-sonic welding.

As indicated earlier, since the projecting surface 335 (FIG. 19) on the inner face 330b of cover 330 extends uninterruptedly around the inlet opening 331 and engages the membrane 320, this surface, cooperating with the membrane, produces a one-way valve action which automatically opens the inlet openings 331 to the interior of the water supply tube 302 when any positive pressure exists within the water supply tube, but automatically blocks the reverse flow of water via openings 331 whenever the pressure within the water supply tube becomes negative. The opening pressure is preferably substantially 0 meters of water, but could be within the range of 0 to 2 meters of water. Thus, during all operating conditions, any pressure within the water supply tube moves the membrane 320 away from the projecting surface 335 of the cover, to permit flow through the water inlet openings 331.

However, when a negative pressure occurs within the water supply tube or a portion thereof, this negative pressure applied to the emitters thereat attracts the membrane 320 against the flat surface 335 to thereby block the reverse flow through the inlet openings 331. This blockage need not be complete, but should be sufficient to prevent dirt from being sucked into the emitter unit.

While the invention has been described with respect to several preferred embodiments, it will be appreciated that these are set forth merely for purposes of example, and that many other variations, modifications and applications of the invention may be made.

What is claimed is:

1. A drip irrigation emitter, comprising:
   a body member having an inlet for receiving pressurized water, an outlet, and a connecting passageway between the inlet and the outlet;
   said connecting passageway including a plurality of baffles spaced from each other in the direction of the water flow from the inlet to the outlet and extending transversely to said direction, each of said baffles being alternatingly joined at one end to the body member and spaced at its opposite end from the body member to define a labyrinth flow path;
   and a deformable membrane overlying said baffles with one face of the membrane engageable with one side of the baffles, and the opposite face of the membrane exposed to the pressure of the water at said inlet such that the membrane is deformable by the inlet pressure towards and away from said baffles to regulate the flow through said labyrinth flow path in response to said inlet pressure;

said baffles being formed with notches in the sides thereof facing said membrane such that the membrane is deformed by an increase in the inlet pressure first into engagement with the sides of the baffles facing the membrane, and then into said notches to regulate the flow to said outlet.

2. The emitter according to claim 1, wherein said sides of the baffles facing the membrane are of a concave configuration.

3. The emitter according to claim 1, wherein said notches are of increasing depth from one end of the labyrinth flow path to the opposite end.

4. The emitter according to claim 1, wherein each of said baffles extends to the region of the center line of said labyrinth flow path.

5. The emitter according to claim 4, wherein said notches are formed at the ends of their respective baffles in the region of the center line of said labyrinth flow path.

6. The emitter according to claim 4, wherein said notches are formed in their respective baffles laterally of the center line of the labyrinth flow path.

7. The emitter according to claim 6, wherein said notches are formed in all the baffles.

8. The emitter according to claim 6, wherein said notches are formed only in alternate baffles.

9. The emitter according to claim 1, wherein said notches have right angle sides.

10. The emitter according to claim 1, wherein said notches have obtuse angle sides.

11. The emitter according to claim 1, wherein the width of each notch is less than one-third the width of its respective baffle.

12. The emitter according to claim 1, wherein said body member is in the form of an elongated strip and is bonded to the inner face of a water supply tube having a discharge opening through its wall communicating with said outlet of the body member.

13. The emitter according to claim 12, wherein the emitter further includes a cover which is secured to the body member to overlie said opposite face of the membrane.

14. The emitter according to claim 13, wherein said cover is attached to said body member by pins on one received within holes in the other.

15. The emitter according to claim 13, wherein said cover is constituted of two half-sections each joined by an integral hinge to a lateral side of the body member, permitting each of said cover half-sections to be folded over and to be secured to the body member with the membrane in between the cover half-sections and the body member.

16. The emitter according to claim 13, wherein one face of said cover faces the interior of the water supply tube, and the opposite face of the cover faces and overlies said opposite face of the membrane; said cover being formed with at least one opening therethrough serving as an inlet of the emitter communicating with the inlet of said body member.

17. The emitter according to claim 16, wherein said one face of the cover is contactable by a feeder slide when fed thereby to the inner surface of the water supply tube, and configured to produce a contact surface with the feeder slide which is perpendicular to the transverse axis of said water supply tube to thereby facilitate the fixing of the cover and the body member to the inner face of the water supply tube as the body member is fed thereto by the feeder slide.

18. The emitter according to claim 16, wherein said one face of the cover is formed with a longitudinally-extending rib eccentric to the longitudinal axis of the cover, said rib facilitating the proper orientation of the cover and body member during the fixing of the cover and body member to the interior of the water supply tube.

19. The emitter according to claim 18, wherein the opposite ends of said body member are formed with eccentric ribs to be aligned with said eccentric rib of the cover, and thereby to facilitate orienting the cover with respect to the body member when attached thereto.

20. The emitter according to claim 16, wherein said opposite face of the cover forms with said membrane a valve which automatically opens said inlet in response to a positive pressure between 0 and 2 meters of water within said water supply tube, and which substantially blocks flow in the reverse direction in response to a negative pressure within the water supply tube.

21. The emitter according to claim 1, wherein said body member and membrane are of circular configuration.

22. The emitter according to claim 21, wherein said membrane is secured to said body member by a cap communicating with said inlet.

23. A drip irrigation emitter, comprising:
a body member in the form of an elongated strip and having an inlet for receiving pressurized water, an outlet, and a connecting passageway including a pressure-reducing flow path between the inlet and the outlet;
a deformable membrane in said pressure-reducing flow path exposed to the pressure of the water at said inlet such that the membrane is deformable by the inlet pressure to regulate the flow through said pressure-reducing flow path in response to said inlet pressure;
and a cover secured to the body member to overlie the membrane;
said cover being constituted of two half-sections each joined by an integral hinge to a longitudinal side of the body member, permitting each cover half-section to be folded over and secured to the body member with the membrane inbetween the cover half-sections and the body member.

24. The emitter according to claim 23, wherein each of said cover half-sections is integrally formed with a plurality of pins adapted to be received in holes formed in the body member for securing the two cover half-sections to the body member with the membrane inbetween.

25. The emitter according to claim 23, wherein said pressure-reducing flow path is a labyrinth-type flow path including a plurality of baffles engageable by said deformable membrane.

26. The emitter according to claim 23, wherein said body member is bonded to the inner face of a water supply tube having a discharge opening through its wall communicating with said outlet of the body member.

27. A drip irrigation emitter, comprising:
a body member having an inlet for receiving pressurized water, an outlet, and a connecting passageway between said inlet and said outlet;
said connecting passageway including a non-regulating pressure-reducing flow path between said inlet and said outlet;
and a one-way valve in said connecting passageway between said non-regulating pressure-reducing flow path and said outlet.

28. The emitter according to claim 27, wherein said non-regulating pressure-reducing flow path is defined by a plurality of baffles which are spaced in the direction of the water flow from the inlet to the outlet, and extend transversely to said direction, with said baffles being alternatingly joined at one end to the body member and spaced from the body member at its opposite end to define a labyrinth flow path.

29. The emitter according to claim 27, wherein said connecting passageway further includes a regulating labyrinth flow path comprising a plurality of baffles spaced in the direction of the water flow from the inlet to the outlet, and extending transversely to said direction, and a deformable membrane overlying said baffles with one face of the membrane engageable with one side of the baffles, and with the opposite face of the membrane exposed to the pressure of the water at said inlet, such that the membrane is deformable by said inlet pressure towards and away from said baffles;

said one-way valve being between the non-regulating pressure-reducing flow path and said regulating labyrinth flow path.

30. The emitter according to claim 27, wherein said body member is in the form of an elongated strip and is bonded to the inner face of a water supply tube having a discharge opening through its wall in communication with the outlet of the body member.

31. The emitter according to claim 28, wherein said water supply tube is formed with a plurality of discharge openings along its length, there being one of said drip irrigation emitters bonded to the inner face of the tube with its outlet in communication with one of said discharge openings.

32. A drip irrigation emitter in the form of an elongated strip to be bonded to the inner face of a water supply tube and having an inlet to communicate with the interior of the water supply tube, and an outlet to communicate with a discharge opening in the water supply tube, said emitter, comprising:

a body member having a connecting passageway including a pressure-reducing flow path between said inlet and outlet;

a deformable membrane in said pressure-reducing flow path exposed to the pressure of the water at said inlet such that the membrane is deformable by the inlet pressure to regulate the flow through said pressure-reducing flow path in response to said inlet pressure;

and a cover secured to the body member to overlie the membrane;

one face of said cover facing the interior of the water supply tube, and the opposite face of the cover facing and overlying said deformable membrane;

said cover being formed with a plurality of pins projecting from said opposite face thereof receivable within holes formed in said body member.

33. The emitter according to claim 32, wherein said pins in the cover are force-fitted within the holes in said body member.

34. The emitter according to claim 32, wherein said pins in the cover are welded within the holes in said body member.

35. The emitter according to claim 32, wherein said cover is ultrasonically welded to said body member.

36. The emitter according to claim 32, wherein said pins in the cover are longer in length than in their transverse dimension.

37. The emitter according to claim 32, wherein said holes in the body member extend through the complete thickness of said body member.

38. The emitter according to claim 37, wherein said pins in the cover are of a length to project completely through said holes so as to be weldable together with the body member to the water supply tube.

39. The emitter according to claim 32, wherein said cover is of rectangular configuration and is formed with one of sa d pins at each of its four corners.

40. The emitter according to claim 32, wherein said body member is bonded to the inner face of a water supply tube hiving a discharge opening through its wall communicating with said outlet of the body member.

41. A drip irrigation emitter in the form of an elongated strip to be bonded to the inner face of a water supply tube aid having an inlet to communicate with the interior of the water supply tube, and an outlet to communicate with a discharge opening in the water supply tube, said emitter, comprising:

a body member having a connecting passageway including a pressure-reducing flow path between said inlet and outlet;

a deformable membrane in said pressure-reducing flow path exposed to the pressure of the water at said inlet such that the membrane is deformable by the inlet pressure to regulate the flow through said pressure-reducing flow path in response to said inlet pressure;

a cover secured to the body member to overlie the membrane;

one face of said cover facing the interior of the water supply tube, and the opposite face of the cover facing and overlying said deformable membrane;

and an eccentric rib projecting perpendicularly from said elongated strip at the side thereof to face inwardly of the water supply tube, when the emitter is bonded thereto, said eccentric rib extending longitudinally of the elongated strip eccentrically with respect to its longitudinal axis to facilitate the proper orientation, and the proper bonding, of the cover and body member to the inner face of the water supply tube.

42. The emitter according to claim 41, wherein said eccentric rib is integrally formed with said cover.

43. The emitter according to claim 42, wherein the opposite ends of said body member are formed with eccentric ribs to be aligned with said eccentric rib of the cover, and thereby to facilitate orienting the cover with respect to the body member when secured thereto.

44. A drip irrigation emitter in the form of an elongated strip having an inlet and outlet, comprising:

a body member having a connecting passageway including a pressure-reducing flow path between said inlet and outlet;

a deformable membrane in said pressure-reducing flow path exposed to the pressure of the water at said inlet such that the membrane is deformable by the inlet pressure to regulate the flow through said pressure-reducing flow path in response to said inlet pressure;

and a cover secured to the body member to overlie the membrane;

said cover being formed with at least one inlet opening therethrough from one face facing the interior of the water supply tube to the opposite face facing said membrane;

said opposite face of the cover forming with said membrane a valve which automatically opens said inlet in response to a pressure of between 0 and 2 meters of water within said water supply tube, and which substantially blocks the flow in the reverse direction in response to a negative pressure within the water supply tube.

45. The emitter according to claim 44, wherein said valve opens at substantially 0 pressure within said water supply tube.

46. The emitter according to claim 44, wherein said opposite face of the cover includes a surface uninterruptedly circumscribing said inlet and engageable by said membrane to thereby define said valve.

47. The emitter according to claim 46, wherein said inlet is defined by an array of openings which array is of oblong shape, and said uninterrupted circumscribing surface is of a corresponding oblong shape to enclose said array of openings.

48. The emitter according to claim 44, wherein said body member is bonded to the inner face of a water supply tube having a discharge opening through its wall communicating with said outlet of the body member.

* * * * *